(12) United States Patent
Waugh et al.

(10) Patent No.: US 11,200,177 B2
(45) Date of Patent: Dec. 14, 2021

(54) CACHE RETENTION DATA MANAGEMENT

(71) Applicant: ARM LIMITED, Cambridge (GB)

(72) Inventors: Alex James Waugh, Cambridge (GB); Dimitrios Kaseridis, Austin, TX (US); Klas Magnus Bruce, Leander, TX (US); Michael Filippo, Driftwood, TX (US); Joseph Michael Pusdesris, Austin, TX (US); Jamshed Jalal, Austin, TX (US)

(73) Assignee: ARM LIMITED, Cambridge (GB)

( * ) Notice: Subject to any disclaimer, the term of this patent is extended or adjusted under 35 U.S.C. 154(b) by 338 days.

(21) Appl. No.: 16/327,501

(22) PCT Filed: Oct. 19, 2016

(86) PCT No.: PCT/GB2016/053252
§ 371 (c)(1),
(2) Date: Feb. 22, 2019

(87) PCT Pub. No.: WO2018/042144
PCT Pub. Date: Mar. 8, 2018

(65) Prior Publication Data
US 2020/0174947 A1    Jun. 4, 2020

(30) Foreign Application Priority Data

Sep. 1, 2016 (GR) .............................. 20160100452

(51) Int. Cl.
*G06F 12/00* (2006.01)
*G06F 12/121* (2016.01)
*G06F 12/0815* (2016.01)

(52) U.S. Cl.
CPC ........ *G06F 12/121* (2013.01); *G06F 12/0815* (2013.01); *G06F 2212/1041* (2013.01)

(58) Field of Classification Search
CPC ............... G06F 12/121; G06F 12/0815; G06F 2212/1041
See application file for complete search history.

(56) References Cited

U.S. PATENT DOCUMENTS

| 6,345,344 B1 | 2/2002 | Arimilli et al. |
| 6,574,710 B1 * | 6/2003 | Gaither ............... G06F 12/0811 711/122 |

(Continued)

FOREIGN PATENT DOCUMENTS

CN    105550155    5/2016

OTHER PUBLICATIONS

International Search Report and Written Opinion of the ISA for PCT/GB2016/053252, dated May 31, 2017, 10 pages.

(Continued)

*Primary Examiner* — Shawn X Gu
*Assistant Examiner* — Mohammad S Hasan
(74) *Attorney, Agent, or Firm* — Nixon & Vanderhye, P.C.

(57) ABSTRACT

A data processing system (2) incorporates a first exclusive cache memory (8, 10) and a second exclusive cache memory (14). A snoop filter (18) located together with the second exclusive cache memory on one side of the communication interface (12) serves to track entries within the first exclusive cache memory. The snoop filter includes retention data storage circuitry to store retention data for controlling retention of cache entries within the second exclusive cache memory. Retention data transfer circuitry (20) serves to transfer the retention data to and from the retention data storage circuitry within the snoop filter and the second cache memory as the cache entries concerned are transferred between the second exclusive cache memory and the first exclusive cache memory.

11 Claims, 5 Drawing Sheets

(56) References Cited

U.S. PATENT DOCUMENTS

| | | | |
|---|---|---|---|
| 7,904,665 B2* | 3/2011 | Watanabe | G06F 12/0828 |
| | | | 711/146 |
| 8,271,733 B2* | 9/2012 | Williamson | G06F 12/0811 |
| | | | 711/128 |
| 9,081,685 B2* | 7/2015 | Grandou | G06F 12/0833 |
| 9,684,597 B1* | 6/2017 | Eiriksson | G06F 12/0815 |
| 2008/0059707 A1* | 3/2008 | Makineni | G06F 12/0897 |
| | | | 711/122 |
| 2008/0256294 A1 | 10/2008 | Gill | |
| 2009/0259813 A1* | 10/2009 | Yasufuku | G06F 12/0811 |
| | | | 711/122 |
| 2011/0307663 A1 | 12/2011 | Kultursay et al. | |
| 2016/0055100 A1* | 2/2016 | Loh | G06F 12/128 |
| | | | 711/122 |
| 2017/0052890 A1* | 2/2017 | Chen | G06F 12/084 |
| 2018/0004661 A1* | 1/2018 | Umehara | G06F 12/0808 |
| 2018/0203800 A1* | 7/2018 | Daglis | G06F 12/1458 |
| 2019/0095205 A1* | 3/2019 | Zbiciak | G06F 12/1036 |
| 2020/0125498 A1* | 4/2020 | Betts | G06F 12/0862 |

OTHER PUBLICATIONS

Jaleel et al., "High Performing Cache Hierarchies for Server Workloads", *2015 IEEE 21st International Symposium on High Performance Computer Architecture (HPCA)*, Feb. 7-11, 2015, 11 pages.

Office Action for TW Application No. 106122995 dated Apr. 9, 2021, 5 pages.

Office Action for GB Application No. 1900640.2 dated Jun. 3, 2021, 2 pages.

\* cited by examiner

CACHE RETENTION DATA MANAGEMENT

This application is the U.S. national phase of International Application No. PCT/GB2016/053252 filed 19 Oct. 2016, which designated the U.S. and claims priority to GR 20160100452 filed 1 Sep. 2016, the entire contents of each of which are hereby incorporated by reference.

This disclosure relates to the field of data processing systems. More particularly, this disclosure relates to data processing systems incorporating a cache memory and using retention data associated with cache entries to control retention of cache entries within the cache memory.

It is known to provide data processing systems with cache memory hierarchies to improve data processing speed and efficiency. Within such cache memory hierarchies it is known, for example, to provide individual, dedicated small cache memories close to a processor core with one or more larger shared cache memories at a level further from the processor cores and shared between the processor cores. Within such cache hierarchies, an individual cache entry may be stored within the small low level cache memories close to the processor cores and/or within the larger higher level cache memories further from and shared between the processor cores. In order to maintain coherence between different copies of a cache entry which may be stored within different portions of the cache hierarchy and a main memory, it is known to provide cache coherency mechanisms including one or more snoop filters which are able to indicate which cache entries are stored within which portions of a cache hierarchy or memory system.

At least some embodiments of the present disclosure provide apparatus for processing data comprising:
a first cache memory;
a second cache memory, said first cache memory communicating with said second cache memory via a communication interface;
a snoop filter located together with said second cache memory on one side of said communication interface and serving to track cache entries stored in said first cache memory on another side of said communication interface, said snoop filter including retention data storage circuitry to store retention data for controlling retention of cache entries within at least said second cache memory; and
retention data transfer circuitry
to transfer retention data for a cache entry from said second cache memory to said retention data storage circuitry when said cache entry is transferred from said second cache memory to said first cache memory, and
to transfer said retention data for said cache entry from retention data storage circuitry to said second cache memory when said cache entry is transferred from said first cache memory to said second cache memory.

At least some embodiments of the present disclosure provide apparatus for processing data comprising:
first cache memory means for storing cache entries;
second cache memory means for storing cache entries, said first cache memory means communicating with said second cache memory means via a communication interface;
snoop filter means for preforming cache snoop operations and located together with said second cache memory means on one side of said communication interface and serving to track cache entries stored in said first cache memory means on another side of said communication interface, said snoop filter means including retention data storage means for storing retention data for controlling retention of cache entries within at least said second cache memory means; and
retention data transfer means
for transferring retention data for a cache entry from said second cache memory means to said retention data storage means when said cache entry is transferred from said second cache memory means to said first cache memory means, and
for transferring said retention data for said cache entry from retention data storage means to said second cache memory means when said cache entry is transferred from said first cache memory means to said second cache memory means.

At least some embodiments of the present disclosure provide a method of processing data comprising:
storing cache entries within a first cache memory;
storing cache entries within a second cache memory;
communicating between said first cache and said second cache memory via a communication interface;
preforming cache snoop operations with a snoop filter located together with said second cache memory on one side of said communication interface and serving to track cache entries stored in said first cache memory on another side of said communication interface, said snoop filter including retention data storage circuitry for storing retention data for controlling retention of cache entries within at least said second cache memory; and
transferring retention data for a cache entry from said second cache memory to said retention data storage circuitry when said cache entry is transferred from said second cache memory to said first cache memory, and
transferring said retention data for said cache entry from retention data storage circuitry to said second cache memory when said cache entry is transferred from said first cache memory to said second cache memory.

Example embodiments will now be described, by way of example only, with reference to the accompanying drawings in which.

Figure 1:
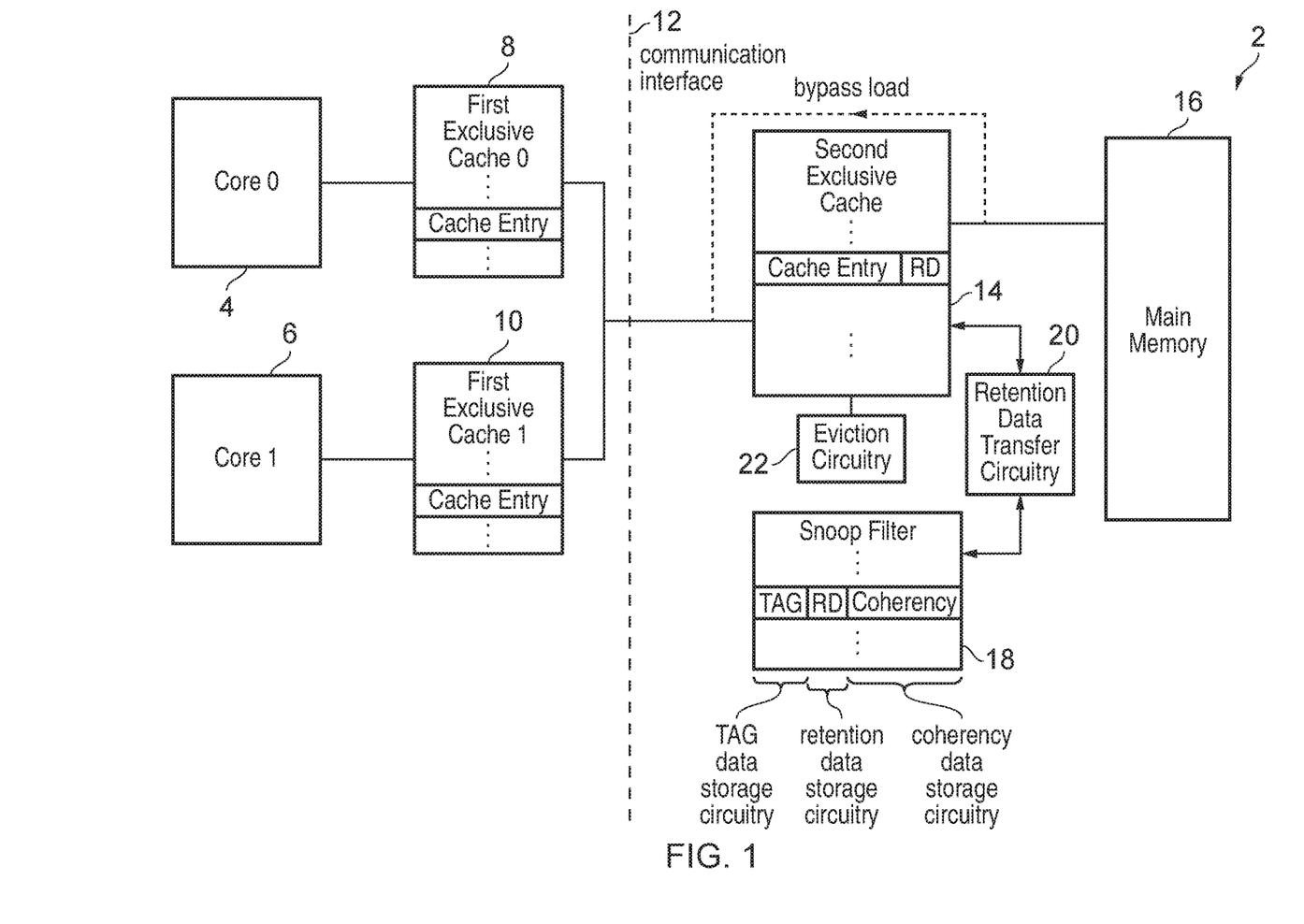
FIG. 1 schematically illustrates a data processing system including a cache hierarchy.

FIG. 1 schematically illustrates a data processing system 2 including a plurality of processor cores 4, 6 each having an associated first exclusive cache memory 8, 10. The first exclusive cache memories 8, 10 communicate via a communication interface 12, such as, for example, a coherent interface using a coherent memory access protocol (e.g. using an architected coherent protocol), with a second exclusive cache memory 14, which in this example embodiment is shared by the processor cores 4, 6 and the first exclusive cache memories 8, 10. A main memory 16 provides data to both the second exclusive cache memory 14 and, via a bypass path, directly to either of the first exclusive cache memories 8, 10 when these perform a data load of a cache entry which is not present within the second exclusive cache memory 14 (a miss within the second exclusive cache memory 14). It will be appreciated that in other example embodiments, the first exclusive cache memories 8, 10 and the second exclusive cache memory 14 need not be exclusive and may instead be non-exclusive or pseudo exclusive.

In the example embodiment of FIG. 1, the first exclusive cache memories 8, 10 and the second exclusive cache memory 14 operate in an exclusive mode whereby a given cache entry is stored within one, but not both, of either the second exclusive cache memory 14 or one of the first exclusive cache memories 8, 10. It may be that a cache entry is shared and is stored in both of the first exclusive cache memories 8, 10, but it will not also be stored within the second exclusive cache memory 14 at the same time. Similarly, when a cache entry is stored within the second exclusive cache memory 14, it will not be stored within either of the first exclusive cache memories 8, 10. It will be appreciated that other modes of operation of cache hierarchies are also possible, such as inclusive modes of operation or partially-exclusive modes of operation. The present techniques may be applied to a wide variety of different types of cache hierarchy and are not limited in application to cache hierarchies operating in a strictly exclusive mode.

A snoop filter 18 is coupled to the second exclusive cache memory 14 on the same side of the communication interface 12 as the second exclusive cache memory 14. The snoop filter 18 serves to track cache entries stored within the first exclusive cache memories 8, 10, such that when a memory access is to be performed, a check can be made using the snoop filter 14 as to whether a cache entry is stored within any of the first exclusive cache memories 8, 10 without needing to send a snoop request via the communication interface 12 to those first exclusive cache memories 8, 10. The snoop filter 18 includes different types of data storage including tag data storage circuitry, retention data storage circuitry and coherency data storage circuitry.

The tag data storage circuitry stores tag data indicative of memory addresses of respective cache entries stored within the first exclusive cache memories 8, 10. The coherency data storage circuitry stores coherency data to track the coherency status of entries stored within the first exclusive cache memories 8, 10, such as whether a cache entry within a particular first exclusive cache memory 8, 10 is stored in a modified, exclusive, shared or invalid state (e.g. in accordance with the MESI coherency protocols). The snoop filter 18 further includes retention data storage circuitry storing retention data for controlling retention of cache entries within at least the second exclusive cache memory 14. As the retention data and the coherency data relate to specific cache entries, the tag data may be used to indicate the particular cache entry concerned and so retention data and coherency data are stored within the snoop filter 18 for each tag data entry corresponding to a cache entry.

As illustrated in FIG. 1, each cache entry within the second exclusive cache memory 14 incorporates retention data associated with that cache entry. This retention data within the second exclusive cache memory 14 is used by eviction circuitry 22 to control selection of a victim cache entry when a cache entry needs to be evicted from the second exclusive cache memory 14 in order to provide room for a new cache entry to be stored into the second exclusive cache memory 14. The retention data may take a variety of different forms, such as data tracking how recently a cache entry has been accessed, e.g. using an eviction algorithm such as a least recently used eviction algorithm. Another example form of retention data may be data indicative of whether a given cache entry has been loaded from the second exclusive cache memory 14 to one of the first exclusive cache memory 8, 10. When one of the processor cores 4, 6, seeks to load data included within a cache entry (cache line) that has not previously been fetched from the main memory 16, the cache entry concerned bypasses storage within the second exclusive cache memory 14 and is loaded directly into the requesting one of the first exclusive cache memories 8, 10. The retention data associated with that cache entry is set to indicate that it has not been subject to a load from the second exclusive cache memory 14 to one of the first exclusive cache memories 8, 10. The retention data for that cache entry loaded directly into one of the first exclusive cache memories 8, 10 is stored within the retention data storage circuitry 18. The entry within the snoop filter 18 for the cache entry concerned includes a tag indicative of the memory address for that cache entry (and which allows the cache entry to be identified) as well as the retention data and the coherency data. The retention data for the cache entries within the first exclusive cache memories 8, 10 is stored within the retention data storage circuitry of the snoop filter 18 on the same side of the communication interface 12 as the second exclusive cache memory 14 rather than being transferred across the communication interface 12 to the first exclusive cache memories 8, 10 and stored therein. This saves storage space within the first exclusive cache memories 8, 10 and reduces the communication overhead and complexity of the communication interface 12 itself as it is no longer responsible for transferring retention data to and from the first exclusive cache memories 8, 10.

When a cache entry is evicted from one of the first exclusive cache memories 8, 10 (using their own eviction mechanisms and eviction algorithms), it is returned to the second exclusive cache memory 14. If the cache entry concerned was previously directly loaded form the main memory 16 to the first exclusive cache memory 8, 10 in which it was needed, upon its return to the second exclusive cache memory its retention data will still indicate that it has not up to that time been loaded from the second exclusive cache memory 14 into one of the first exclusive cache memories 8, 10. Subsequently, ff before that cache entry is evicted from the second exclusive cache memory 14, a further load of data within that cache entry is made by one of the processor cores 4, 6, then the cache entry concerned will be loaded back into the appropriate one of the first exclusive cache memories 8, 10 from the second exclusive cache memory 14 rather than from the main memory 16. When such a further load occurs, the retention data for that cache entry is marked to indicate that the cache entry concerned has been subject to a load from the second exclusive cache memory 14 to one of the first exclusive cache memories 8, 10.

It has been found that there is a correlation between the usefulness of retaining a cache entry within the second exclusive cache memory 14 and whether or not that cache entry has previously been subject to a load from the second exclusive cache memory 14 to either of the first exclusive cache memories 8, 10. If a cache entry is directly loaded from the main memory 16 to one of the first exclusive cache memories 8, 10, evicted to the second exclusive cache memory 14 and then not be loaded from that second exclusive cache memory 14 back to one of the first exclusive cache memories 8, 10, then it is likely of low potential usefulness to retain that cache entry within the second exclusive cache memory 14. Conversely, a cache entry which is evicted from one of the first exclusive cache memories 8, 10 back to the second exclusive cache memory 14 and then reloaded from the second exclusive cache memory 14 back to one of the first exclusive cache memories 8, 10 is likely to have a high probability of reuse and accordingly likely to be worth while maintaining (not evicting from) within the second exclusive cache memory 14. The eviction circuitry 22 accordingly uses the retention data value indicative of whether or not a cache entry has been loaded from the second exclusive cache memory 14 to one of the first exclusive cache memories 8, 10 as part of its determination as to which cache entry should be selected as a victim cache entry to be evicted from the second exclusive cache memory 14 when more space is required within the second exclusive cache memory 14 so as to retain the cache entries most likely to be re-used.

Retention data transfer circuitry 20 is associated with the second exclusive cache memory 14 and the snoop filter 18 and serves to transfer retention data for a cache entry into the retention data storage circuitry of the snoop filter 18 when that cache entry is transferred from the second exclusive cache memory 14 to one of the first exclusive cache memories 8, 10. When the cache entry is returned from the first exclusive cache memory 8, 10 holding that cache entry back to the second exclusive cache memory 14, then the retention data transfer circuitry serves to return the retention data associated with that cache entry to the second exclusive cache memory 14 where it is stored in association with the cache entry 14. The retention data transfer circuitry 20 is responsible for transferring retention data to and from the retention data storage circuitry within the snoop filter 18 as corresponding cache entries are transferred across the communication interface 12 to and from an appropriate one of the first exclusive cache memories 8, 10. When a cache entry is directly loaded from the main memory 16 via the bypass path to one of the first exclusive cache memories 8, 10, a retention value for that cache entry is set at that time and stored by the retention data transfer circuitry into the associated entry within the snoop filter for the cache entry which has been loaded to the appropriate one of the first exclusive cache memories, 8, 10. In this case the retention data is not transferred from within the second exclusive cache memory 14, but is directly set within the retention data storage circuitry of the snoop filter 18. When that cache entry is evicted from the first exclusive cache memory 8, 10 in which it is held to the second exclusive cache memory 14, then the retention data transfer circuitry 20 transfers its retention data to the entry within the second exclusive cache memory 14.

Figure 2:
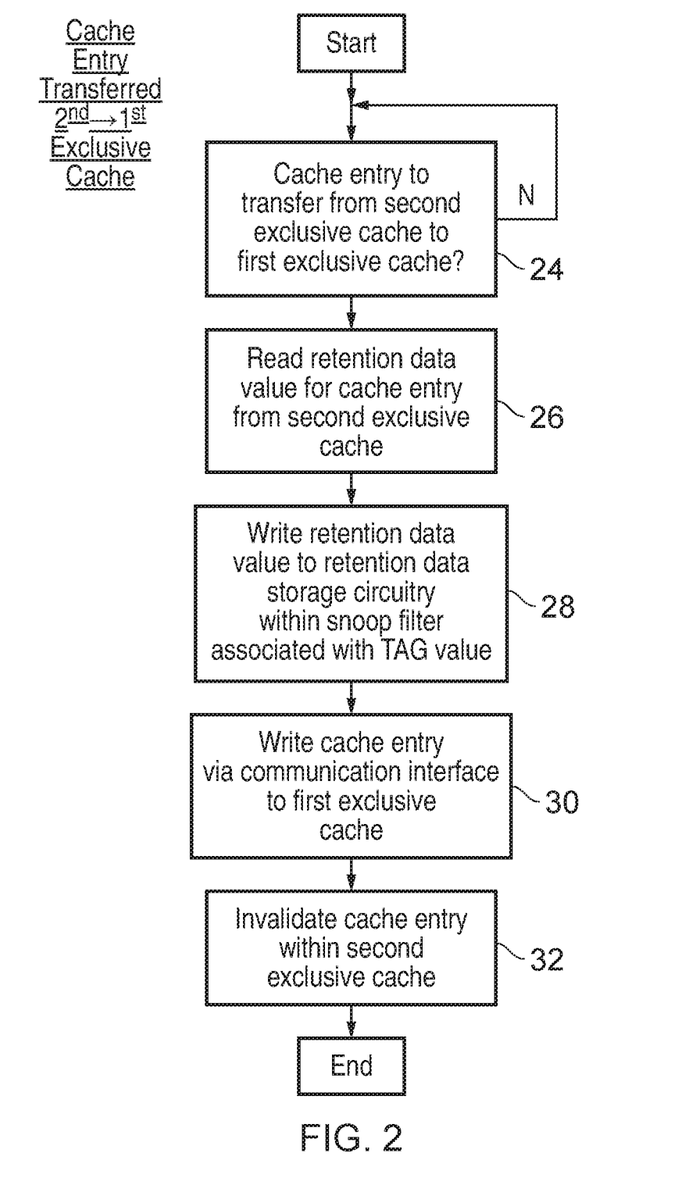
FIG. 2 is a flow diagram schematically illustrating operation when a cache entry is transferred from a second exclusive cache memory to a first exclusive cache memory.

FIG. 2 is a flow diagram schematically illustrating the process of transferring a cache entry from the second exclusive cache memory 14 to one of the first exclusive cache memories 8, 10. At step 24 processing waits until there is a cache entry to transfer from the second exclusive cache memory 14 to the first exclusive cache memory 8, 10. This condition is satisfied when there is a cache hit within the second exclusive cache memory 14 following a cache miss within the appropriate one of the first exclusive cache memories 8, 10. When the need to perform a transfer is identified at step 24, processing proceeds to step 26 at which the retention data value for the cache entry to be transferred is read from the second exclusive cache memory 14. Step 28 then writes the retention data value read at step 26 into the retention data storage circuitry within the snoop filter 18 and associated with the tag value held by the snoop filter 18 which is to track the presence of the cache entry within the first exclusive cache memory 8, 10 to which it is to be transferred. Step 30 writes the cache entry via the communication interface 12 to the first exclusive cache memory 8, 10. Step 32 invalidates the cache entry within the second exclusive cache memory 14 in accordance with the exclusive mode of operation of this example embodiment.

Figure 3:
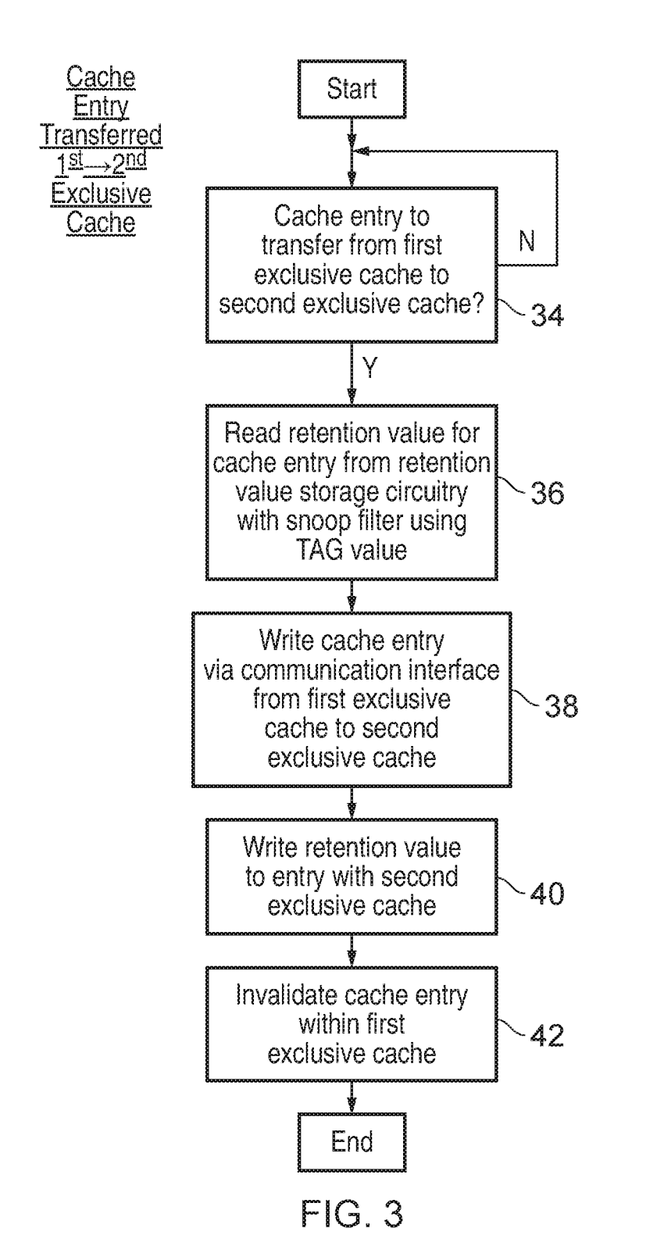
FIG. 3 is a flow diagram schematically illustrating processing when a cache entry is transferred from the first exclusive cache memory to the second exclusive cache memory.

FIG. 3 is a flow diagram schematically illustrating the process of transferring a cache entry from one of the first exclusive cache memories 8, 10 to the second exclusive cache memory 14. Step 34 waits until there is a cache entry to transfer from one of the first exclusive cache memories 8, 10 to the second exclusive cache memory 14. The requirement to transfer such an entry may arise upon an eviction from the first exclusive cache memory 8, 10, such as resulting from the use of an eviction mechanism and policy within the first exclusive cache memory 8, 10 which can have a variety of different forms, such as least reasonable used (LRU), round robin, random etc. When a requirement to make a transfer is identified at step 34, processing proceeds to step 36 at which the retention value for the cache entry to be transferred is read from the retention value storage circuitry within the snoop filter 18 using the tag value associated with the cache entry to be transferred to identify the appropriate retention data value within the snoop filter 18. Step 38 writes the cache entry to be transferred via the communication interface 12 from the first exclusive cache memory 8, 10 to the second exclusive cache memory 14. The cache entry may have been modified whilst stored within the first exclusive cache memory 8, 10. Step 40 writes the retention value read at step 36 into the cache entry within the second exclusive cache memory 14. Step 42 serves to invalidate the cache entry within the first exclusive cache memory 8, 10 in accordance with the exclusive mode of operation of the above described example embodiment. It will be appreciated that exclusive mode operation is non-essential and other example embodiments may operate partially exclusively or inclusively.

Figure 4:
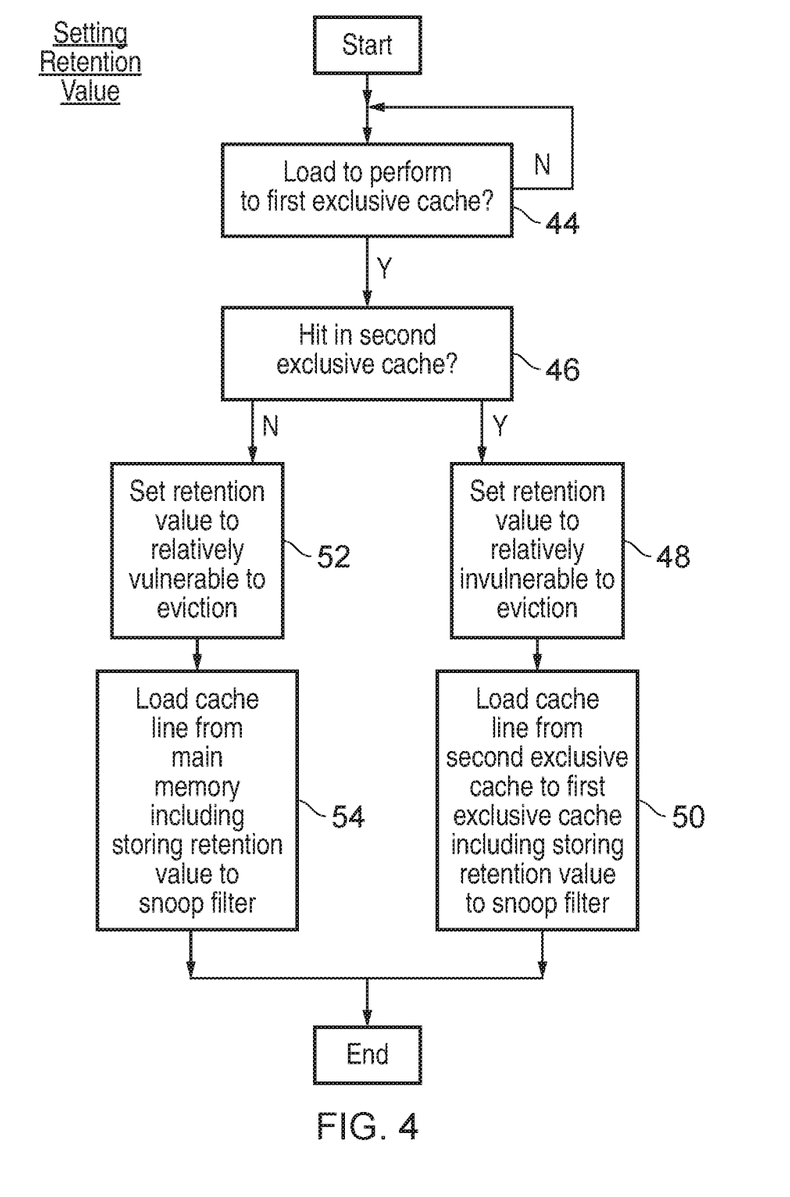
FIG. 4 is a flow diagram schematically illustrating the setting of a retention value associated with a cache memory.

FIG. 4 is a flow diagram schematically illustrating the setting of a retention data value. Processing waits at step 44 until there is a requirement to load a cache entry to one of the first exclusive cache memories 8, 10. Such a requirement may arise due to a cache miss within one of the first exclusive cache memories 8, 10. When a load is required, processing proceeds to step 46 where a lookup is made within the second exclusive cache memory 14 to determine whether or not the cache entry concerned is present within the second exclusive cache memory 14. If there is a hit within the second exclusive cache memory 14, then processing proceeds to step 48 at which the retention value for the cache entry concerned is set to indicate relatively invulnerability to subsequent eviction from the second exclusive cache memory 14. This does not mean that the cache entry concerned cannot be evicted from the second exclusive cache memory 14, but rather that it is less likely to be selected for eviction by the eviction circuitry 22 compared to a cache entry which is marked as relatively vulnerable to eviction. Step 50 then loads the cache line from the second exclusive cache memory 14 to the first exclusive cache memory 8, 10 in which the miss occurred. At the same time, the retention data (value) for the cache line concerned is loaded to the associated entry for the cache line within the snoop filter 18.

If the determination at step 46 is that there was a miss within the second exclusive cache memory 14, then step 52 serves to set the retention value for the cache line to be loaded to indicate a relatively vulnerability to eviction (see previous discussion). Step 54 then loads the cache line from the main memory 16 and stores the retention value (retention data) to the associated entry for the cache entry concerned within the snoop filter 18.

Figure 5:
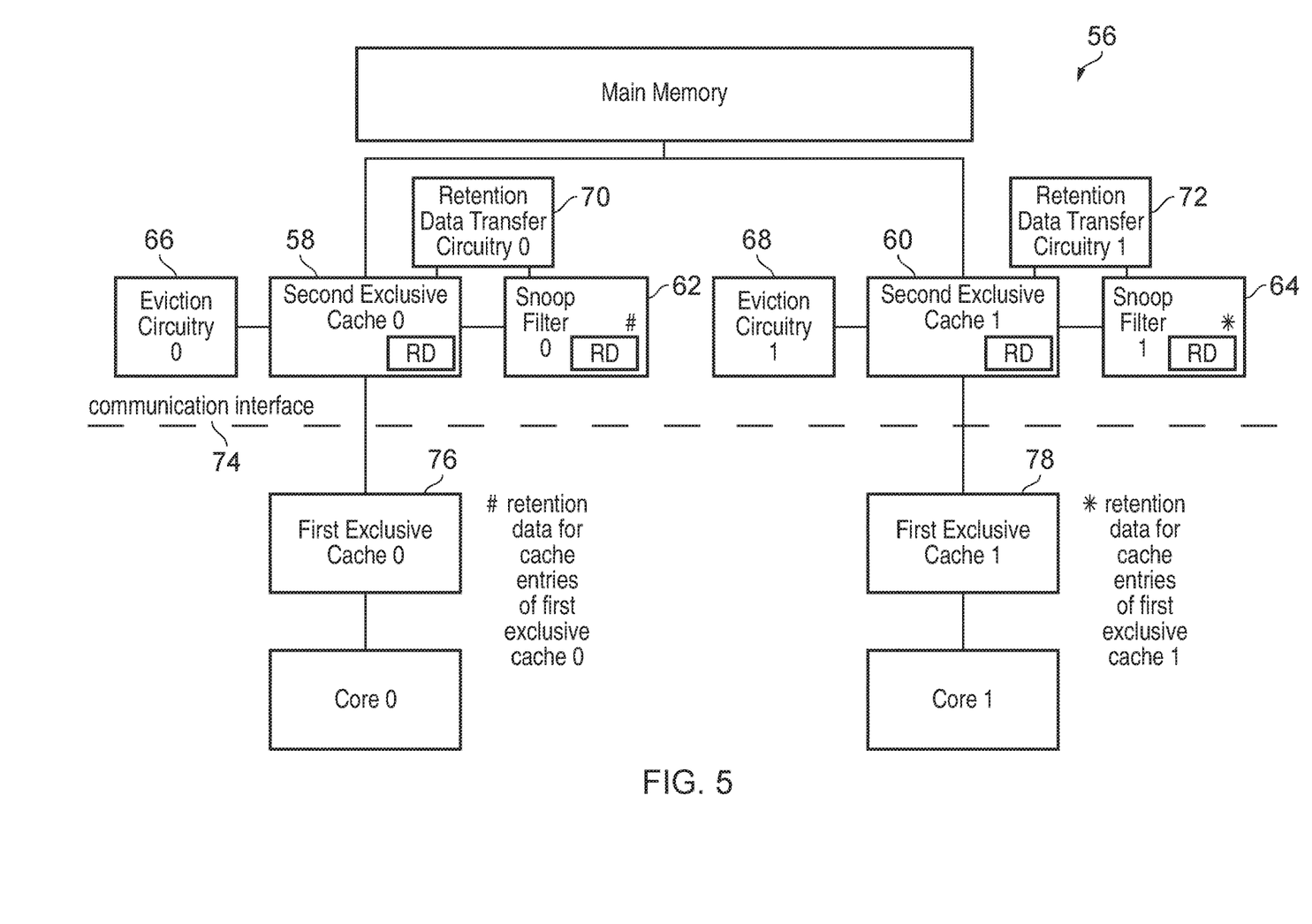
FIG. 5 schematically illustrates a further example embodiment of a data processing system including a cache hierarchy.

FIG. 5 schematically illustrates a further example embodiment of a data processing system 56 incorporating the present techniques. In this example embodiment, multiple second exclusive cache memories 58, 60 are present. Each of these second exclusive cache memories 58, 60 has associated snoop filters 62, 64, associated eviction circuitry 66, 68 and associated retention data transfer circuitry 70, 72. The second exclusive cache memories 58, 60 communicate via a communication interface 74 with first exclusive cache memories 76, 78. In this example embodiment there is only one first exclusive cache memory 76, 78 associated with each of the second exclusive cache memories 58, 60. The snoop filter circuitry 62, 64 serves to track entries within the first exclusive cache memory 76, 78 associated with the second exclusive cache memory 58, 60 to which it is coupled. The snoop filters 62, 64 include retention data storage circuitry for storing retention data in respect of cache entries held within the associated first exclusive cache memory 76, 78 of their respective second exclusive cache memories 58, 60. The retention data transfer circuitry 70, 72 serves to transfer the retention data between the second exclusive cache memory 58, 60 and the snoop filter 62, 64 as the corresponding cache entry is transferred across the communication interface 74 to and from the first exclusive cache memory 76, 78.

The invention claimed is:

1. Apparatus for processing data, comprising:
   a first cache memory;
   a second cache memory, said first cache memory communicating with said second cache memory via a communication interface;
   a snoop filter located together with said second cache memory on one side of said communication interface and serving to track cache entries stored in said first cache memory on another side of said communication interface, said snoop filter including retention data storage circuitry to store retention data for controlling retention of cache entries within at least said second cache memory; and
   retention data transfer circuitry
      to transfer retention data for a cache entry from said second cache memory to said retention data storage circuitry when said cache entry is transferred from said second cache memory to said first cache memory, and
      to transfer said retention data for said cache entry from retention data storage circuitry to said second cache memory when said cache entry is transferred from said first cache memory to said second cache memory.

2. Apparatus as claimed in claim 1, wherein said snoop filter includes tag data storage circuitry to store a plurality of data tags indicative of memory addresses of respective ones of said cache entries stored within said first cache memory and said retention data for respective ones of said cache entries stored within said first cache memory are associated with corresponding data tags.

3. Apparatus as claimed in claim 1, comprising eviction circuitry to evict cache entries from said second cache memory, wherein said eviction circuitry selects a victim cache entry to be evicted from said second cache memory in dependence upon said retention data for said cache entries stored within said second cache memory.

4. Apparatus as claimed in claim 1, wherein said snoop filter includes coherency data storage circuitry to store coherency data to track coherency status of said cache entries stored within said first cache memory.

5. Apparatus as claimed in claim 1, wherein said retention data is indicative of whether a cache entry has been loaded from said second cache memory to said first cache memory.

6. Apparatus as claimed in claim 1, wherein, when a given cache entry is loaded from a main memory to said first cache memory bypassing storage within said second cache memory, said retention data value for said given cache entry is set within said retention data storage circuitry.

7. Apparatus as claimed in claim 1, comprising a cache memory hierarchy including said second cache memory and a plurality of first cache memories, wherein said snoop filter tracks cache entries stored in said plurality of first cache memories and said retention data storage circuitry stores retention data for cache entries stored within said plurality of first cache memories.

8. Apparatus as claimed in claim 1, wherein said first cache memory is a first exclusive cache memory.

9. Apparatus as claimed in claim 1, wherein said second cache memory is a second exclusive cache memory.

10. Apparatus for processing data, comprising:
    first cache memory means for storing cache entries;
    second cache memory means for storing cache entries, said first cache memory means communicating with said second cache memory means via a communication interface;
    snoop filter means for preforming cache snoop operations and located together with said second cache memory means on one side of said communication interface and serving to track cache entries stored in said first cache memory means on another side of said communication interface, said snoop filter means including retention data storage means for storing retention data for controlling retention of cache entries within at least said second cache memory means; and
    retention data transfer means
        for transferring retention data for a cache entry from said second cache memory means to said retention data storage means when said cache entry is transferred from said second cache memory means to said first cache memory means, and
        for transferring said retention data for said cache entry from retention data storage means to said second cache memory means when said cache entry is transferred from said first cache memory means to said second cache memory means.

11. A method of processing data, comprising:
    storing cache entries within a first cache memory;
    storing cache entries within a second cache memory;
    communicating between said first cache and said second cache memory via a communication interface;
    preforming cache snoop operations with a snoop filter located together with said second cache memory on one side of said communication interface and serving to track cache entries stored in said first cache memory on another side of said communication interface, said snoop filter including retention data storage circuitry for storing retention data for controlling retention of cache entries within at least said second cache memory; and
    transferring retention data for a cache entry from said second cache memory to said retention data storage circuitry when said cache entry is transferred from said second cache memory to said first cache memory, and
    transferring said retention data for said cache entry from retention data storage circuitry to said second cache memory when said cache entry is transferred from said first cache memory to said second cache memory.

* * * * *